United States Patent [19]

Lightstone et al.

[11] 4,449,781

[45] May 22, 1984

[54] MULTIMODE OPTICAL FIBER COUPLER

[75] Inventors: Alexander W. Lightstone, Montreal; H. Keith Eastwood, Beaconsfield; Frank Szarka, Elmira, all of Canada

[73] Assignee: Her Majesty the Queen in Right of Canada as represented by the Minister of National Defense, Toronto, Canada

[21] Appl. No.: 323,581

[22] Filed: Nov. 20, 1981

Related U.S. Application Data

[63] Continuation of Ser. No. 78,730, Sep. 25, 1979, abandoned.

[30] Foreign Application Priority Data

Jul. 4, 1979 [CA] Canada .................................. 331176

[51] Int. Cl.$^3$ ................................................ G02B 7/26
[52] U.S. Cl. .............................. 350/96.15; 350/96.16
[58] Field of Search ............... 350/96.15, 96.16, 96.21

[56] References Cited

U.S. PATENT DOCUMENTS

| | | | |
|---|---|---|---|
| 4,087,156 | 5/1978 | Kao et al. | 350/96.21 |
| 4,291,940 | 9/1981 | Kawasaki et al. | 350/96.15 |
| 4,392,712 | 7/1983 | Ozeki | 350/96.16 |

OTHER PUBLICATIONS

Ozeki et al., "New Star Coupler Compatible with Single Multimode-Fibre Data Links," *Electr. Lett.*, vol. 12, Feb. 1976, 2 pp.
Kawasaki et al., "Low-Loss Access Coupler for Multimode Optical Fiber Distribution Networks," *Appl. Optics*, vol. 16, No. 7, Jul. 1977, pp. 1794-1795.
Rawson et al., "Bitaper Star Couplers with up to 100 Fibre Channels," *Electr. Lett.*, vol. 15, No. 14, Jul. 1979, pp. 432-433.

*Primary Examiner*—John D. Lee
*Attorney, Agent, or Firm*—Cushman, Darby & Cushman

[57] ABSTRACT

An optical fiber coupler is described for operatively coupling together two or more optical fibers. Each coupler consists of several biconically tapered fibers. The biconical sections of each fiber are placed side by side or twisted around one another, and fused together. The couplers are typically made of optical fibers having a diameter in the range from about 100 to about 300 microns. The fiber comprises a core of glass having a high index of refraction and cladding of glass with a low index of refraction. The cladding of each biconical section has been reduced by chemical etching, plasma etching, ion-milling, abrasion or the like, to a thickness not exceeding 25 percent of the core diameter, more preferably less than 10 percent and most preferably from about 5 percent to about 10 percent of the core diameter. The couplers are of step or graded index optical fiber. The design can be adapted as multiport access couplers when more than two fibers are involved. The reduction of cladding thickness is essential to produce optical fiber couplers with a coupling coefficient of about 40 percent and an average loss of about 10 percent.

11 Claims, 5 Drawing Figures

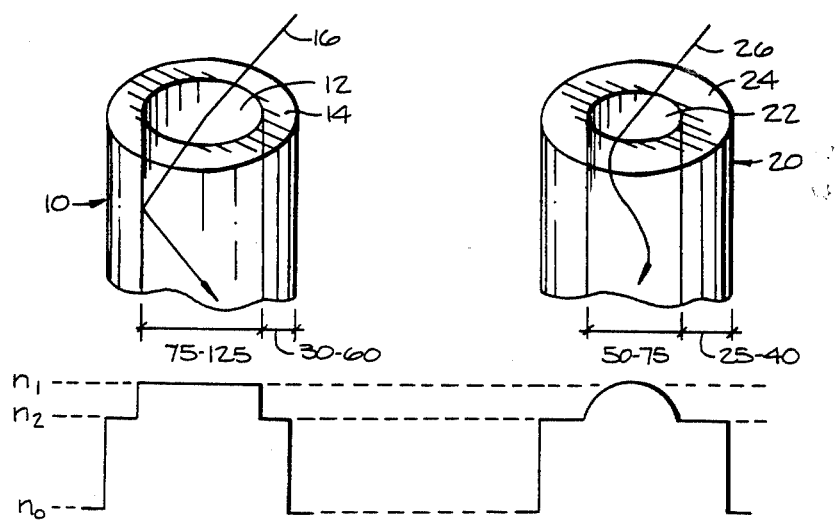
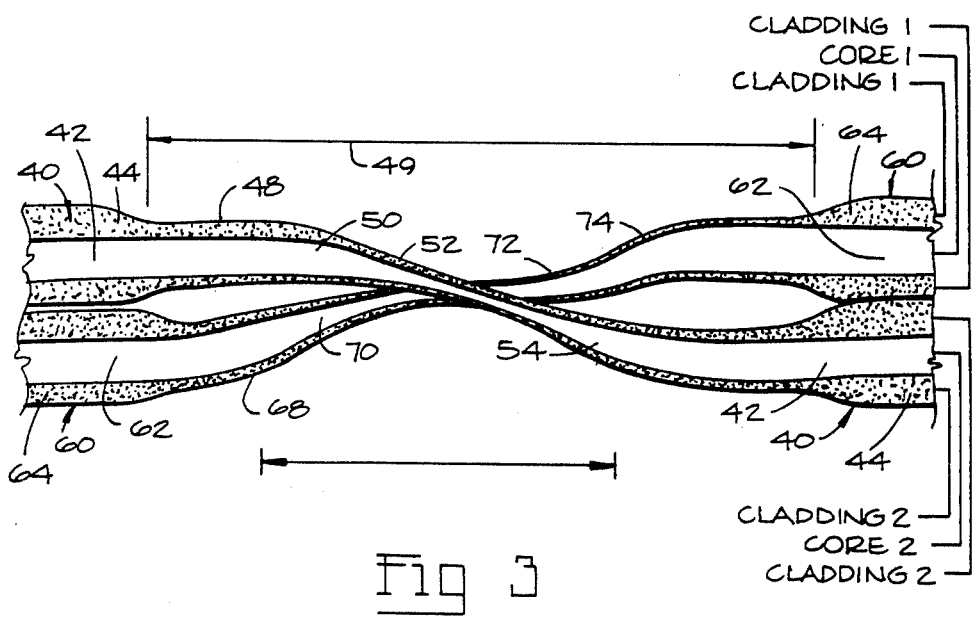

MULTIMODE OPTICAL FIBER COUPLER

This is a continuation, of application Ser. No. 78,730 filed Sept. 25, 1979 (now abandoned).

This invention relates to an optical fiber coupler. More particularly, the invention relates to an improved optical fiber coupler having characteristics of high coupling and low loss.

BACKGROUND OF THE INVENTION

Multimode optical fibers consist of glass fibers that are typically in the range from about 100-300 microns in diameter. The length of such fibers can be from several meters to several kilometers. Light can be guided through the interior of such fibers by manufacturing them with a core of glass having a high index of refraction, and an exterior cladding of glass having a low index of refraction. Where two discrete types of glass are used, the fiber is said to be of a step index type. Where there is a gradual decrease in the refractive index from the inside to the outside of the fiber, the fiber is of the graded index type. In both instances, however, the outer most layer of glass, i.e., the cladding, is typically tens of microns thick.

To shield the light from being absorbed by dirt or other objects on the fiber surface, especially over long lengths, the cladding is kept fairly thick. For instance, in a graded index fiber of the Corning Company, the core diameter is 62.5 microns with a cladding thickness of 31.25 microns. Thus, the total fiber diameter is 125 microns (core plus two thicknesses of cladding).

A good review of optical fibers can be found in the textbook "Fibre Optics, Theory and Practice"; by W. B. Allan, 1973 Plenum Press, London.

An optical fiber coupler can be considered an optical device which shares the light travelling down one fiber with at least one other fiber. Such a device is essential for communications by optical fibers since there are many instances when one wishes to access the data carried by a main fiber, or to send data from a secondary fiber to a main or trunk fiber. For example, in cable television applications the main trunk fiber, which carries the television signals, would be connected by subsidiary fibers to each household. Each junction of a subsidiary fiber with the main fiber would require an optical fiber coupler.

It will clearly be recognized that the less light that is wasted by an optical fiber coupler, the better will be the communications system using that coupler.

One prior art optical fiber coupler of which we are aware comprises two fused fibers which are also biconically tapered in the fusion region. That design was concerned primarily with the biconical tapering and twisting of the two fibers during fusing. Any modifications or analysis with respect to the thickness of the cladding were not considered and are not encompassed in that earlier design. This earlier design is described in the following:

1. Paper by T. Ozeki and B. Kawasaki in Applied Physics Letters, Vol. 28, P. 528, 1976, entitled "Optical Directional Coupler Using Tapering Section in Multimode Fibers".

2. Paper by B. Kawasaki and K. Hill in Applied Optics, Vol. 16, P. 1794, 1977, entitled "Low Loss Access Coupler for Multimode Fiber Distribution Networks".

SUMMARY OF THE INVENTION

The present invention describes an optical fiber coupler which has a highly efficient coupling action and very low loss. The present invention embodies a design that is structurally fairly simple, and is applicable to a wide variety of optical fibers. Accordingly, there is provided in one form of this invention an optical fiber coupler for operatively coupling together at least two optical fibers each of which includes a core of light transmitting material having a high index of refraction, and a cladding of a light transmitting material having a low index of refraction, said coupler comprising: a portion of a first optical fiber having a biconically tapered section therein; a portion of at least another optical fiber also having a biconically tapered section therein, the biconically tapered sections of each fiber extending in contact with one another and being fused together over a portion of said biconically tapered section with the cladding of each biconically tapered section being reduced to a thickness not exceeding 25 percent of the core diameter, thereby yielding an access coupler having a highly efficient coupling action and very low loss.

In a still more prefered form of the invention, the cladding thickness in the biconically tapered sections is typically reduced to less than about 10 percent of the predetermined core diameter, and most preferably in the range from about 1/10 to about 1/20 of said core diameter.

These and other features and advantages of this invention will become apparent from the detailed description below. That description is to be read in conjunction with the accompanying drawings which illustrate one preferred embodiment of this invention.

DESCRIPTION OF THE DRAWINGS

In the drawings,

FIGS. 1a and 1b and 2a and 2b are schematic drawings illustrating respectively a typical refractive index profile of a stepped index fiber, and a graded index fiber;

FIG. 3 is a side elevation view taken in cross-section longitudinally and coaxially of one preferred embodiment of an optical fiber coupler according to this invention;

DETAILED DESCRIPTION OF THE PREFERRED EMBODIMENT

Figure 4:
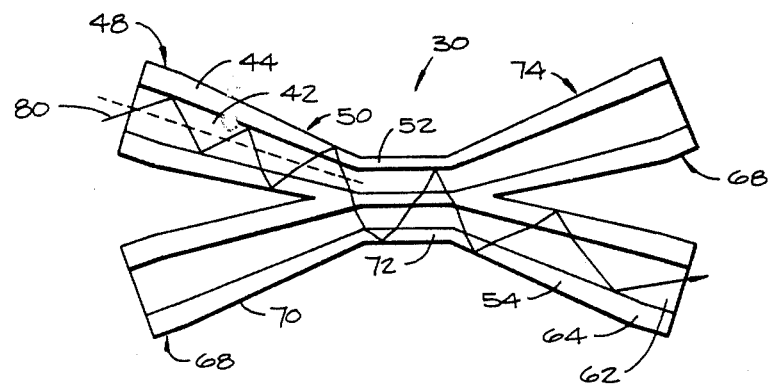
FIG. 4 is also a side elevation view taken in cross-section coaxially of the longitudinal axis of the coupler of FIG. 3 showing the light ray reflections as bounces.

FIG. 1a illustrates schematically a portion of a stepped index multimode optical fiber 10. This optical fiber 10 is seen to comprise an inner core 12 of a light transmitting medium having a high index of refraction, typically glass. The core 12 is commonly in the range of about 75 to 125 microns in diameter. Surrounding the core 12 is an outer layer or cladding 14 of a light transmitting medium having a low index of refraction, and also typically being of glass. The cladding 14 is commonly from about 30 to 60 microns in thickness. The numeral 16 indicates the path of a ray of light entering the end face of the core 12 and the manner in which it is refracted initially upon entering the core 12 and subsequently from the interface between the core 12 and cladding 14.

FIG. 2a illustrates schematically an optical fiber 20 that is a multimode fiber having a graded index of refraction. Here too, a central core of a light transmitting material is shown at 22, surrounded by an outer layer or cladding 24 of a light transmitting material having a low index of refraction. The core 22 has a high index of refraction. The numeral 26 represents the path of a ray of light entering this graded index multimode optical fiber. Since by definition there is a gradual decrease in the refractive index from the inside to the outside of the fiber, the path of the ray of light 26 is curved smoothly. The core is typically from 50–75 microns in diameter, the cladding from 25–40 microns in thickness.

Accordingly, the path of the ray 16 of light entering and being transmitted along the step index multimode optical fiber 10 comprises a finite number of discrete straight line sections, said sections being straight throughout those regions where the index of refraction does not change. By contrast, the path of the ray 26 of light entering and being transmitted along the graded index multimode optical fiber 20 is curved, effectively comprising an infinite number of discrete straight line sections that are of minute length.

FIGS. 1b and 2b simply illustrate schematically the refractive index profile for the multimode fibers 10 and 20, respectively.

Turning now to FIG. 3, there is shown at 30 a preferred form of optical fiber coupler envisaged by this invention. That optical fiber coupler comprises a first optical fiber 40 and a second additional optical fiber 60. The optical fibers 40 and 60 are of the multimode type, and respectively comprise cores 42 and 62 of a light transmitting medium or material, typically glass, having a high index of refraction. Surrounding the cores 42 and 62 are outer layers or cladding 44 and 64. The cladding 44 and 64 are also of a light transmitting medium or material, typically glass, having a low index of refraction.

More specifically, the first optical fiber 40 contains a biconical section 48 extending generally lengthwise over a distance indicated by the arrow 49. The biconical section 48 is seen to comprise a zone or section of down taper 50, an intermediate region 52 and a section or zone of up taper 54. The sections of down taper 50 and up taper 54 are located on opposite sides of the region 52, where fibers 40 and 60 are in contact. The region 52 is typically one to three millimeters in length.

The biconical section 68 of the second optical fiber 60 also comprises a zone or section of down taper 70, an intermediate region 72 and a zone or section of up taper 74. As before, the zones or sections of down taper 70 and up taper 74 are located on opposite sides of the region 72. It is seen from FIGS. 3 and 4 wherein like numerals indicate corresponding parts, the biconical sections 48 and 68 of the two optical fibers 40 and 60 overlap in the regions 72 and 52.

In keeping with the main feature of this invention, the cladding 44 and 64 is reduced in thickness over at least the biconical sections 48 and 68 of each optical fiber making up the optical fiber coupler 30. The cladding thickness is reduced by chemical etching, preferably using a solution of hydrofluoric and nitric acid. Reducing the cladding thickness can also be carried out by ion milling, plasma etching, or abrasion. The cladding thickness is reduced to an amount not exceeding 25 percent of the core diameter. More preferably, the cladding in the biconical sections 48 and 68 is reduced to a thickness not exceeding about 10 percent of the core diameter. An even more preferred range that has been successfully tested uses a cladding thickness in the biconically tapered sections which is in the range from about 1/10 to about 1/20 of the core diameter. It is also noted here that the reduction in the thickness of the cladding need only be carried out in the vicinity of the biconical taper.

Having described the structural aspects of an optical fiber coupler encompassing the present invention, it will perhaps be useful to comment in general terms on the theory and secondly on the principles of fabrication of an optical fiber coupler as envisaged herein. As shown by the arrow 80 of FIG. 4, a typical ray of light undergoes a series of reflection or "bounces" as it is transmitted through the biconical section 48. At each such bounce there is a discrete change in the angle of incidence of the light ray at the interface of the core and cladding material and the interface of the cladding and air. Towards the end of the up-tapered sections 54 and 74, the angle of incidence of the light ray at the interface of the core and cladding material must be high for the ray of light to return exclusively to the core. However, this angle changes by discrete amounts, decreasing in the down-tapered sections, but increasing in the up-tapered section, and the number of "bounces" in the up-tapered sections may not be sufficient to make the angle large enough to preclude some of the light from remaining in the cladding. Thinning the cladding results in thinning of the entire fiber, and, therefore, increases the number of "bounces" which the ray of light undergoes. If the number of "bounces" is high, then the probability is that the decrease of the angle in the down taper section will be exactly cancelled in the up taper section, with the result that the angle of incidence at the cladding/core interface will be large and the ray of light recaptured by the core. Computer simulations have borne out this theory.

Figure 5:
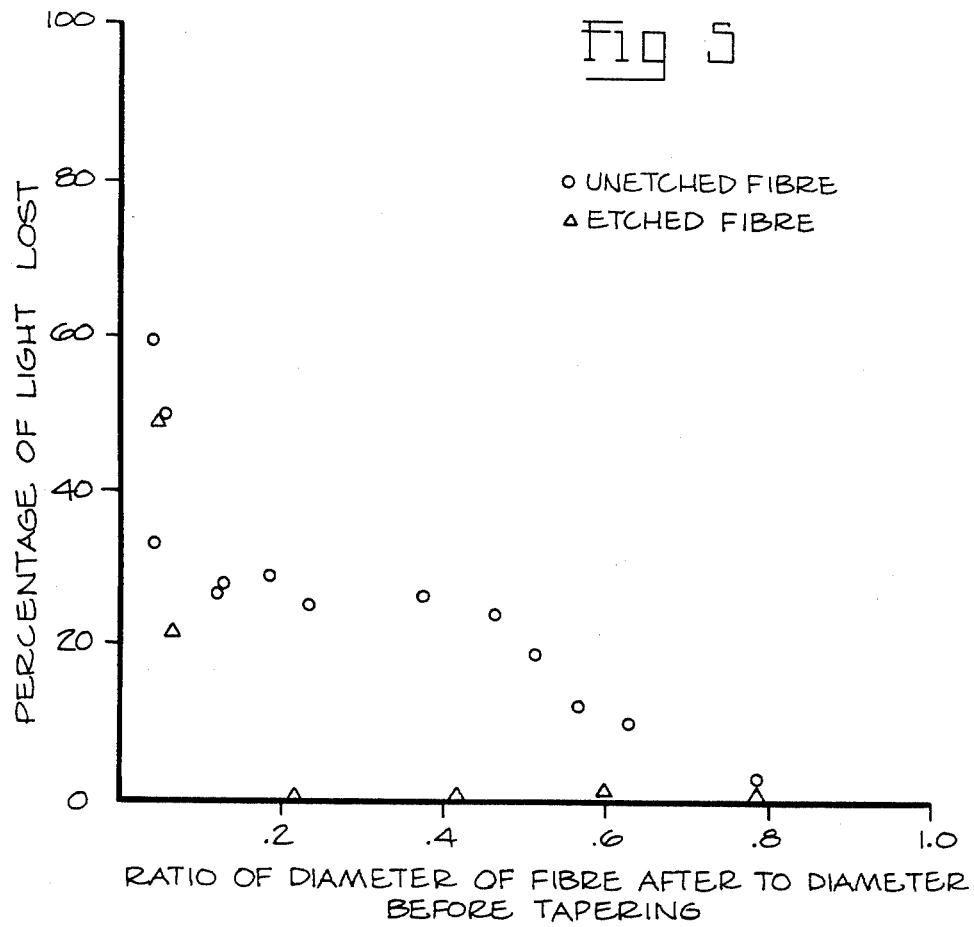
FIG. 5 is a graphical representation to illustrate the experimentally measured amounts of light lost in a simple single fiber taper of an etched fiber and an unetched fiber.

Another factor and of lesser importance, is that in passing from the cladding to the core, a ray of light attempts to pass from a material having a low index of refraction (the cladding) to a material having a high index of refraction (the core). At such an interface, a small percentage of the light will be reflected into the cladding. This is called Fresnel reflection, and is commonly experienced when looking through air out a window. In the latter example, an observer will frequently see a reflection of himself from the window. In the case of the optical fiber coupler, thinning of the cladding again increases the number of "bounces" which a ray of light must make. Thus, even if some fraction of light was subject to Fresnel reflection, ie, reflected at the core/cladding interface, the amount of light in the cladding will be reduced by each subsequent reflection. To further substantiate these views, a series of single fiber biconical tapers were made. The losses of light in even a single fiber taper were then observed. These losses are plotted in the graph of FIG. 5, against a so-called tapering ratio, i.e., the ratio of the minimum diameter after tapering, to the diameter without tapering. Two such series of results are shown; one where the optical fiber is unetched, and the other where the optical fiber is etched to an outer diameter of 68 microns. As can clearly be seen, for the same tapering ratio, the etched fiber had significantly lower losses than the unetched fiber.

In preparing the above-described optical fiber couplers, two optical fibers are first etched over a length of about 2 centimeters in a solution of hydrofluoric acid and nitric acid. Such etching is allowed to progress until the thickness of the cladding is less than one quarter, i.e., less than 25 percent of the diameter of the core.

In the extreme, if the cladding is removed completely from the optical fiber, light could proceed from one fiber to the other without the fibers being fused to one another. Although there would be evidence of considerable optical coupling, the device simply would not be mechanically sound.

Upon removal from the acid bath, the etched regions of the fibers were placed next to one another. The optical fibers are then twisted with approximately one full twist being used every 2 centimeters of length. The twisted fibers are then mounted in such a way that a small amount of tension is applied to them. A suitable heating source, such as an oxy-butane torch is used to heat the twisted portion of the fibers to simultaneously stretch and fuse the same.

Table I below indicates the effect that etching of the cladding can have. The optical couplers were made as described above, and by hand, with no specific attempt being made to monitor geometrical properties other than the cladding thickness.

TABLE I

Couplers fabricated from Corning Graded Index Fiber: 125 microns outer diameter; 62.5 microns core diameter. All the couplers were manufactured with the aim of producing about 20% coupling. The coupling coefficient is the percentage of light entering the first fiber which exits the second.

| Coupling Coefficient | Loss | |
|---|---|---|
| (A) Outer Fiber Diameter Etched from 125 Microns to 68 Microns. | | |
| 20% | 12% | Average Loss = 10.5% |
| 20% | 7% | Standard Deviation of Loss = 6.3% |
| 22% | 20% | |
| 21% | 1% | |
| 21% | 8% | |
| 23% | 8% | |
| 23% | 9% | |
| 21% | 19% | |
| (B) Outer Fiber Diameter Etched from 125 Microns to 98 Microns | | |
| 19% | 32% | Average Loss = 29.7% |
| 23% | 31% | Standard Deviation of Loss = 3.2% |
| 21% | 26% | |
| (C) Outer Diameter Not Etched (125 Microns.) | | |
| 18% | 54% | Average Loss = 45.2% |
| 20% | 49% | Standard Deviation of Loss = 14.6% |
| 21% | 32% | |
| 17% | 38% | |
| 19% | 59% | |
| 19% | 53% | |
| 22% | 18% | |
| 18% | 59% | |

Prior to any heating of the optical fibers, light was injected into one of them. This was considered as the main fiber. A light meter was provided at the other end of the main fiber, and the original reading of transmitted light read from this meter, prior to tapering, was recorded. Another light meter was similarly provided at the corresponding end of the second optical fiber. Initially, no light was detectable from this second fiber since there was no input of light and the two fibers have not yet been coupled together.

Subsequently, the two optical fibers were fused together and stretched slowly, while an operator monitored the amount of light being coupled to the second fiber. When the light meter reading indicated that 20% of the light originally entering the main fiber had been coupled into the secondary fiber, heating was stopped. By totaling the readings from both light meters, and subtracting from the original reading of light transmitted by the main fiber, the amount of light lost can be determined. With the optical fibers etched to 68 microns, the couplers had an average loss of 10.5%. By comparison, optical fibers etched to 98 microns had an average loss of 29.7%; while unetched optical fibers had an average loss of 45.2%, more than four times as great as that of the etched fibers.

Because there is always some loss of light, the theoretical maximum coupling coefficient of 50%, i.e., an equal sharing of incident light, can never be reached. However, an impressive 40% coupling coefficient is readily obtainable with etched optical fiber couplers envisaged by this invention.

Table II which follows lists typical results obtained on optical fiber couplers fabricated from etched Corning Graded Index Fibers to have a coupling coefficient of 40%. The results obtained indicate an average loss of only 10.4%.

TABLE II

Outer Diameter Etched from 125 Microns to 68 Microns. Coupling Objective is 40%.

| Coupling Coefficient | Loss | |
|---|---|---|
| 41.5% | 15% | Average Loss = 10.4% |
| 39.8% | 18.5% | Standard Deviation of Loss = 5.3% |
| 43.4% | 5% | |
| 41.6% | 3% | |
| 40.6% | 12% | |
| 39.0% | 9% | |
| 37.5% | 14% | |
| 42.6% | 7% | |

The above-described technique of using an optical fiber which has been etched to reduce the loss of light therefrom is also used in making so-called star couplers. These are optical fiber couplers in which the light from one fiber only is introduced into many other fibers. In the following example, four Corning Graded Index fibers were etched to a thickness of less than 75 microns, were twisted around each other, and heated while under a slight amount of tension. Light passing through one fiber was monitored and the heating withdrawn when the light passing through this fiber had diminished to 30% of its original intensity. Light coming out of the other three fibers was then measured. Table III below lists the measured amounts of light exiting from each fiber. The total amount of light exiting the coupler device was 84.3% of the light introduced into the first or main fiber, representing a loss of only 15.7%.

TABLE III

Coupler fabricated from four Corning Graded Index Fibers: 62.5 microns core diameter, outer diameter etched from 125 microns to 71 microns.

| | Power Exiting Fibers Prior to Heating | Power Exiting Fibers After Heating |
|---|---|---|
| Fiber No. 1 | 0.248 watts | 0.0744 watts |
| Fiber No. 2 | 0 | 0.0459 watts |
| Fiber No. 3 | 0 | 0.0515 watts |
| Fiber No. 4 | 0 | 0.0372 watts |
| Total | 0.248 watts | 0.209 watts |

Loss of Light = 15.7%

Etching of the cladding of an optical fiber to reduce the loss has been used in making optical fiber couplers as envisaged herein, from a wide variety of optical fibers. These include the following:

| (1) | Corning graded index fiber (cited above) |
| --- | --- |
| | outer diameter = 125 microns |
| | core diameter = 62.5 microns |
| | Numerical aperture = .20 |
| (2) | Corning step index fiber |
| | outer diameter = 125 microns |
| | core diameter = 85 microns |
| | Numerical aperture = .14 |
| (3) | Corning step index fiber |
| | outer diameter = 140 microns |
| | core diameter = 90 microns |
| | Numerical aperture = .30 |
| (4) | Canadian Wire & Cable step index Phasil fiber |
| | outer diameter = 125 microns |
| | core diameter = 85 microns |
| | Numerical aperture = .26 |

In the instances described above, etching of the cladding on the optical fiber was crucial to reducing the loss of light transmitted through the coupler device. Thus, etching of the cladding constitutes an important step in the manufacture of optical fiber couplers using the biconical taper concept. This is surprising since the existence of a cladding plays an essential role in the prior art biconically tapered coupler described in the two publications noted on the introductory pages of this specification.

It is only the cladding of the two fibers which are in good optical contact, and it is in this medium, the cladding, where light is shared, i.e., transmitted from one fiber to the other.

Although the optical fiber coupler of FIG. 3 shows two optical fibers twisted around one another, this is not essential. It will suffice in the context of the present invention to place the biconical sections side-by-side and fuse them together in that configuration.

The optical fibers may also be of different core diameters to enable preferential coupling of light from one fiber to another.

The foregoing description has set forth details of a preferred form of optical fiber coupler envisaged by this invention. Some variations and alternative forms have also been suggested. It is intended herein to encompass all such changes and modifications as would be apparent to those skilled in this art, and which fall within the scope of the claims below.

The embodiments of the invention in which an exclusive property or privilege is claimed are defined as follows:

1. An optical fiber coupler made from at least one source fiber having a predetermined ratio of cladding thickness to core diameter, said coupler being operative to couple together at least two optical fibers each of which includes a core of a light transmitting material having a high index of refraction, and a cladding of light transmitting material having a low index of refraction, said coupler comprising;
    a portion of a first optical fiber having a bionally tapered section therein, and in which portion there is a first region of fiber on which the ratio of cladding thickness to core diameter is said predetermined ratio of one of said source fibers, the core thickness being between 50 and 75 microns and the cladding thickness being between 25 and 40 microns and in which there is a second region which includes the biconically tapered section, in which second region the cladding thickness has been reduced thus decreasing said predetermined ratio to one in which the cladding thickness to core diameter is not more than 25%; and
    a portion of at least one other optical fiber having a biconically tapered section therein, and in which portion of said other optical fiber there is also a first region of fiber on which the ratio of cladding thickness to core diameter is the predetermined ratio of one of said source fibers, the core thickness being between 50 and 75 microns and the cladding thickness being between 25 and 40 microns and in which there is a second region which includes said biconically tapered section of said other optical fiber, in which second region the cladding thickness has been reduced hence decreasing said predetermined ratio to one in which the cladding thickness to core diameter is not more than 25%, the biconically tapered sections of each fiber extending in contact with one another and being fused over a portion of said biconically tapered sections.

2. An optical fiber coupler made from at least one source fiber having a predetermined ratio of cladding thickness to core diameter, said coupler being operative to couple together at least two optical fibers each of which includes a core of a light transmitting material having a high index of refraction, and a cladding of light transmitting material having a low index of refraction, said coupler comprising;
    a portion of a first optical fiber having a bionally tapered section therein, and in which portion there is a first region of fiber on which the ratio of cladding thickness to core diameter is said predetermined ratio of one of said source fibers, and in which there is a second region which includes the biconically tapered section, in which second region the cladding thickness has been reduced thus decreasing said predetermined ratio to one in which the cladding thickness to core diameter is not more than about 10%; and
    a portion of at least one other optical fiber having a biconically tapered section therein, and in which portion of said other optical fiber there is also a first region of fiber on which the ratio of cladding thickness to core diameter is the predetermined ratio of one of said source fibers, and in which there is a second region which includes said biconically tapered section of said other optical fiber, in which second region the cladding thickness has been reduced hence decreasing said predetermined ratio to one in which the cladding thickness to core diameter is not more than about 10%, the biconically tapered sections of each fiber extending in contact with one another and being fused over a portion of said biconically tapered sections.

3. The optical fiber coupler defined in claim 2, wherein each fiber is a stepped index multimode glass giber having a core diameter in the range of 75 to 125 $\mu$m and a cladding thickness in the range of 30 to 60 $\mu$m.

4. The optical fiber coupler defined in claim 2, wherein each fiber is a graded index multimode glass fiber having a core diameter in the range of 50 to 70 $\mu$m and a cladding thickness in the range of 25 to 40 $\mu$m.

5. The optical fiber coupler defined in claim 2 wherein the diameter of each optical fiber is in the range from about 100 to about 300 microns.

6. The optical fiber coupler defined in claim 1 or 2 wherein the contacting portions of the optical fibers are twisted before being fused.

7. The optical fiber coupler defined in claim 1 or 2 wherein the cladding of the biconically tapered sections of the optical fibers is reduced to a thickness in the range of 5 to 10 percent of the core diameter.

8. The optical fiber coupler defined in claim 1 or 2 wherein a plurality of optical fibers are provided to form a multiport coupler.

9. The optical fiber coupler defined in claim 1 or 2 wherein the fused portion is about one to three millimeters in length.

10. An optical fiber coupler as defined in claim 1 or 2 wherein said optical fibers are of different core diameters to enable preferential coupling of light from one fiber to another.

11. The optical fiber coupler defined in claim 1 or 2, wherein the biconically tapered sections of said first and another optical fiber overlap as an X.

* * * * *